United States Patent Office 2,873,198
Patented Feb. 10, 1959

2,873,198

HARD REFRACTORY COMPOSITIONS

Edward W. Goliber, Royal Oak, Mich., assignor to General Electric Company, a corporation of New York No Drawing. Original application January 4, 1955, Serial No. 479,861. Divided and this application April 17, 1958, Serial No. 729,061

1 Claim. (Cl. 106—65)

This application is a division of application S. N. 479,861, filed January 4, 1955.

This invention relates to hard refractory compositions produced by powder metallurgy from pulverulent mixtures of alumina and lower oxides or suboxides of titanium. Lower oxides or suboxides of titanium as used herein refers to oxides of titanium containing less oxygen than is present in a normal titanium dioxide and includes titanium-oxygen solid solutions containing as little as five weight percent oxygen.

The need for materials having high strength and high hardness, as well as general chemical inertness, is ever increasing and of major importance in present industrial applications. Such materials are extremely useful in manufacturing cutting tools, extrusion and drawing dies, critical wear parts, etc.

It is known that the lower oxides or suboxides of titanium, for example, those approximating titanium monoxide in composition, are hard substances. However, these materials by themselves lack strength and are much too brittle for practical use. In my copending application, Serial No. 432,934, filed May 27, 1954, assigned to the assignee of the present invention, I have disclosed that the extreme brittleness and fragility of titanium suboxides alone can be overcome by pressing and sintering pulverulent mixtures of titanium suboxides and chromium, the resulting products being strong, hard and chemically inert.

It now has been found that extremely hard and comparatively strong materials can be obtained by sintering intimate mixtures of pulverulent titanium suboxides and alumina. Not only are these compositions stronger than the titanium suboxides alone, but they also offer advantages over sintered alumina in that they are stronger and can be sintered at somewhat lower temperatures.

The amounts of the components employed in preparing the compositions of the present invention may vary within certain limits. For example, extremely hard and comparatively strong substances may be produced from pulverulent titanium suboxides and alumina mixed and sintered in proportions such that the final sintered body contains aluminum and titanium in an Al/Ti atomic ratio of between .8 and 20. The oxygen content may also vary and may be present in an amount equivalent to that required for the complete oxidation of aluminum to $Al_2O_3$ with an additional amount present equivalent to an O/Ti atomic ratio of between .25 and 1.4. More specifically, the oxygen content may vary such that the atomic ratio $$\frac{O - 3/2\ Al}{Ti}$$

lies between .25 and 1.4.

It is to be understood that minor amounts of impurities may be introduced in the starting materials and during processing. Iron, for example, may be present as an impurity in amounts up to about 1 percent, by weight.

The above limits are not intended to restrict the invention to materials containing only titanium suboxide and alumina phases. The materials of the invention may contain other phases resulting from the interaction of these two substances.

By using the specified compositional ranges of the invention, both strength and hardness can be combined in a single material. These limits are critical since only compositions within these limits display the desired hardness as well as the desired strength. The criticality of these limits is best illustrated by the examples hereinafter found.

In one embodiment of this invention, the pulverulent mixed oxides used in preparing the compositions of the present invention may be conveniently prepared by reacting an intimate mixture of aluminum and titanium dioxide in the desired proportions. In order to prepare some compositions, it may be necessary to admix titanium metal powder or alumina, as the case may be. These powders may be mixed and caused to react by heating from about 1000° C. to about 1400° C. in a hydrogen atmosphere. The reacted briquettes, being porous, are readily crushed or milled to a fine powder. Because the initial metal powders are somewhat oxidized and because some oxidation occurs during processing, a slightly less amount of oxygen is added in the form of oxides than corresponds to the final oxygen content desired.

An additional amount of alumina may be added to this reacted powder and the final mixture intimately mixed by ball milling for periods ranging up to several days, pressed, and sintered in a hydrogen atmosphere.

In another embodiment of this invention, the titanium suboxides employed may be prepared from an intimate mixture of titanium metal powder and titanium dioxide mixed in predetermined proportions. The resulting powder is then reacted and crushed as described above. This titanium suboxide is then mixed with alumina and processed as described in the first embodiment.

In order that those skilled in the art may better understand how the present invention may be practiced, the following examples are given by way of illustration and not by way of limitation. All parts and percentages are by weight.

EXAMPLE 1

A mixed oxide deficient in oxygen was prepared by intimately mixing 28.2 parts of aluminum metal powder containing 94.6 percent aluminum, 56.4 parts of titanium dioxide and 75.5 parts of alumina. The mixed powders were pressed into briquettes and the briquettes thereafter reacted in a hydrogen atmosphere at about 1350° C. Thereafter the briquettes were crushed to a fine powder. 34 parts of this powder and 51 parts of alumina powder were intimately mixed by milling with acetone in a carbide ball mill for an additional period of 72 hours. The powder was dried, cold pressed at about 20,000 p. s. i., and the compact thereafter sintered on a hydrogen atmosphere at about 1600° C. for approximately 30 minutes.

The resulting product was found to be electrically conductive, extremely hard, having a hardness of about 94 Rockwell A, and strong, having a modulus of rupture strength of about 90,000–95,000 p. s. i. Comparison of this composition with those disclosed in my aforementioned copending application S. N. 432,934 show that it is much harder.

The composition of the final sintered product is as follows:

|  | Percent |
|---|---|
| Aluminum | 47.1 |
| Titanium | 8.2 |
| Oxygen (by difference) about | 44.7 |

It is understood that minor amounts of impurities may have been introduced in the starting materials and during processing.

The effect of oxygen content on the properties of the compositions of this invention is shown in Table I which follows. The final sintered compositions listed in each of the examples contain aluminum and titanium in an Al/Ti atomic ratio of about 4.7/1. These compositions were prepared by employing the process used in Example 1. The oxygen referred to in column 1 is that remaining after deducting the amount required to completely oxidize the aluminum to $Al_2O_3$.

*Table I*

|           | O/Ti Atomic Ratio | Modulus of Rupture |
|-----------|-------------------|---------------------|
| Example 2 | .4                | 70,000–85,000       |
| Example 3 | .8                | 60,000–70,000       |
| Example 4 | 1.1               | 80,000–90,000       |
| Example 5 | 1.38              | 50,000–65,000       |

The effect of aluminum and titanium contents on the strength of the composition of the invention is shown below in Table II. These compositions contain oxygen equivalent in amount to that required to completely oxidize the aluminum to $Al_2O_3$ plus an additional amount equivalent to an O/Ti ratio of approximately 1.

*Table II*

|           | Al/Ti Atomic Ratio | Modulus of Rupture |
|-----------|--------------------|---------------------|
| Example 6 | .3                 | 30,000–45,000       |
| Example 7 | 1.75               | 50,000–70,000       |
| Example 8 | 4.7                | 60,000–80,000       |
| Example 1 | 10                 | 80,000–100,000      |
| Example 9 | 16                 | 60,000–85,000       |

The examples described above are limited to compositions prepared from alumina and titanium suboxides. Substantially stronger but somewhat softer materials can be made from chromium, alumina and titanium oxides, as described in my copending parent application S. N. 479,861.

While the processes employed in the foregoing examples may be adopted as general procedure in preparing the compositions of this invention, it is to be understood that variations in processing are within the scope of the invention. For example, sintering temperatures may be varied from about 1450 to 1650° C. and inert atmospheres other than hydrogen may be employed for the sintering. Additionally, the usual procedures and techniques employed in powder metallurgy and ceramics for molding or processing of powders generally are applicable and the compositions may be varied to obtain variations in properties as desired.

The compositions of the present invention have a wide range of utility. Due to their unique properties, they may be used in the fabrication of cutting tools, extrusion and drawing dies, critical furnace parts, critical wear parts, etc.

What I claim as new and desire to secure by Letters Patent of the United States is:

A sintered strong and hard composition consisting essentially of a lower oxide of titanium and alumina and in which composition the aluminum titanium atomic ratio is from about .8 to about 20, and the oxygen content is such that the atomic ratio $$\frac{O - 3/2\,Al}{Ti}$$

lies between .25 and 1.4.

No reference cited.